(12) United States Patent
Yamamoto et al.

(10) Patent No.: US 9,114,992 B2
(45) Date of Patent: Aug. 25, 2015

(54) CARBON FIBERS, CATALYST FOR PRODUCTION OF CARBON FIBERS, AND METHOD FOR EVALUATION OF CARBON FIBERS

(71) Applicant: SHOWA DENKO K.K., Minato-ku, Tokyo (JP)

(72) Inventors: Ryuji Yamamoto, Tokyo (JP); Yuusuke Yamada, Tokyo (JP); Takeshi Nakamura, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 0 days.

(21) Appl. No.: 13/973,545

(22) Filed: Aug. 22, 2013

(65) Prior Publication Data

US 2014/0054179 A1   Feb. 27, 2014

(30) Foreign Application Priority Data

Aug. 24, 2012 (JP) .................................. 2012-185815

(51) Int. Cl.
| | |
|---|---|
| *B01J 23/745* | (2006.01) |
| *B01J 23/881* | (2006.01) |
| *H01M 4/02* | (2006.01) |
| *H01M 4/36* | (2006.01) |
| *H01M 4/90* | (2006.01) |
| *C01B 31/02* | (2006.01) |
| *B01J 23/847* | (2006.01) |
| *D01F 9/127* | (2006.01) |

(Continued)

(52) U.S. Cl.
CPC .............. *C01B 31/02* (2013.01); *B01J 21/185* (2013.01); *B01J 23/8472* (2013.01); *B01J 23/881* (2013.01); *B01J 23/8877* (2013.01); *B01J 37/0234* (2013.01); *B01J 37/04* (2013.01); *B82Y 30/00* (2013.01); *B82Y 40/00* (2013.01); *C01B 31/0233* (2013.01); *D01F 9/127* (2013.01); *D01F 9/1273* (2013.01); *H01G 11/40* (2013.01); *H01G 11/86* (2013.01); *H01M 4/663* (2013.01); *B01J 37/0238* (2013.01); *Y02E 60/13* (2013.01)

(58) Field of Classification Search
CPC .... B01J 23/745; B01J 23/881; B01J 23/8472; C01B 31/022; C01B 31/0233; H01M 4/02; H01M 4/36; H01M 4/90
USPC ............ 502/312, 316, 338; 423/447.1–447.3; 977/742, 843; 429/523, 527
See application file for complete search history.

(56) References Cited

U.S. PATENT DOCUMENTS

| | | | | |
|---|---|---|---|---|
| 5,102,647 | A | * | 4/1992 | Yamada et al. ............. 423/447.3 |
| 5,997,832 | A | * | 12/1999 | Lieber et al. .................. 423/249 |

(Continued)

FOREIGN PATENT DOCUMENTS

| | | | | |
|---|---|---|---|---|
| WO | 2009/153969 | * | 12/2009 | ............... B01J 23/76 |
| WO | 2012/081249 A1 | | 6/2012 | |

OTHER PUBLICATIONS

European Search Report issued in EP Application No. 13181176.2, dated Oct. 31, 2013.

(Continued)

*Primary Examiner* — Patricia L Hailey
(74) *Attorney, Agent, or Firm* — Sughrue Mion, PLLC

(57) ABSTRACT

Provided are carbon fibers with low metal ion elution amount without subjecting to high-temperature heat treatment, in which the metal ion may be sometimes precipitated on an electrode of electrochemical devices such as batteries and capacitors to cause short-circuit. The carbon fibers comprises Fe, at least one catalyst metal selected from the group consisting of Mo and V, and a carrier; wherein the carbon fibers have an R value (ID/IG) as measured by Raman spectrometry of 0.5 to 2.0 and have an electrochemical metal elution amount of not more than 0.01% by mass.

20 Claims, 3 Drawing Sheets

(51) Int. Cl.

| | | |
|---|---|---|
| *H01G 11/86* | (2013.01) | |
| *H01M 4/66* | (2006.01) | |
| *B01J 23/887* | (2006.01) | |
| *H01G 11/40* | (2013.01) | |
| *B82Y 30/00* | (2011.01) | |
| *B82Y 40/00* | (2011.01) | |
| *B01J 37/02* | (2006.01) | |
| *B01J 37/04* | (2006.01) | |
| *B01J 21/18* | (2006.01) | |

(56) References Cited

U.S. PATENT DOCUMENTS

| | | | |
|---|---|---|---|
| 6,761,870 B1 * | 7/2004 | Smalley et al. | 423/447.3 |
| 7,338,648 B2 * | 3/2008 | Harutyunyan et al. | 423/447.3 |
| 7,485,600 B2 * | 2/2009 | Harutyunyan et al. | 502/336 |
| 8,048,821 B2 * | 11/2011 | Ryu et al. | 502/324 |
| 2004/0091416 A1 | 5/2004 | Harutyunyan et al. | |
| 2004/0162216 A1 | 8/2004 | Moy et al. | |
| 2008/0153691 A1 * | 6/2008 | Jung et al. | 502/240 |
| 2011/0104490 A1 | 5/2011 | Kambara et al. | |
| 2012/0141355 A1 * | 6/2012 | Moy et al. | 423/447.3 |
| 2014/0010749 A1 * | 1/2014 | Nakamura et al. | 423/447.1 |
| 2014/0087184 A1 * | 3/2014 | Choi et al. | 428/367 |

OTHER PUBLICATIONS

Huang W., et al., 99.9% purity multi-walled carbon nanotubes by vacuum high-temperature annealing, Carbon, Elsevier, Oxford, GB, vol. 41. No. 13, Jan. 1, 2003, pp. 2585-2590.

* cited by examiner

CARBON FIBERS, CATALYST FOR PRODUCTION OF CARBON FIBERS, AND METHOD FOR EVALUATION OF CARBON FIBERS

This application claims priority under 35 U.S.C. sect. 119(a) on Patent Application No. 2012-185815 filed in Japan on Aug. 24, 2012, the entire contents of which are hereby incorporated by reference.

TECHNICAL FIELD

The present invention relates to carbon fibers, catalyst for production of carbon fibers, and a method for evaluation of carbon fibers. More particularly, the present invention relates to carbon fibers synthesized by supported catalyst, which exhibit low elution amount of metal derived from catalyst metals; catalyst for production of the carbon fibers; and a method for evaluation of the elution amount of metal of carbon fibers in case the carbon fibers are added in an electrode of a battery or a capacitor.

BACKGROUND ART

The method for production of carbon fibers includes chemical vapor deposition methods (methods in which hydrocarbon and the like is thermally decomposed on catalyst metals to form carbon fibers), and physical vapor deposition methods (methods in which graphite is allowed to undergo sublimation by arc, laser or the like to form carbon fibers in a cooling process).

The chemical vapor deposition methods are methods suited for large-scale synthesis since it is comparatively easy to scale-up a reactor.

The chemical vapor deposition methods can be roughly classified into two methods. One is a method in which a solution, prepared by dissolving metal compounds serving as catalyst or co-catalyst such as sulfur in hydrocarbon such as benzene, is supplied to reaction field heated at 1,000° C. or higher using hydrogen as carrier gas, and formation of catalysts and growth of carbon fibers are performed in the field (floating catalyst method). The other one is a method in which supported catalyst (in which catalyst metals or precursors are supported on carrier) prepared in advance is placed in the reaction field heated at 500 to 700° C., and mixed gasses of hydrocarbon such as ethylene with hydrogen or nitrogen is supplied and then reacted (supported catalyst method).

Since the reaction is performed in high temperature range of 1,000° C. or higher in the floating catalyst method, not only decomposition of the hydrocarbon on the catalyst metals but also an self-decomposition reaction of hydrocarbon proceeds. Pyrolytic carbon is deposited on the carbon fibers grown from the catalyst metals as the starting point, and carbon also grows in the thickness direction of the fibers. The carbon fibers obtained by this method have comparatively low conductivity since they are coated with pyrolytic carbon having low crystallinity. Therefore, the carbon fibers are synthesized by the floating catalyst method, and then graphitized by heat treatment in an inert gas atmosphere at a temperature of 2,600° C. or higher. The heat treatment enables proceeding of crystal rearrangement and graphite crystal growth, leading to an improvement in conductivity of the fibers. The heat treatment also enables vaporization of the catalyst metals to give carbon fibers with less impurity.

On the other hand, since the reaction is performed at 500 to 800° C. in the supported catalyst method, the self-decomposition reaction of the hydrocarbon is suppressed. It is possible to obtain thin carbon fibers as a result of growing from the catalyst metals as the starting point. The obtained carbon fibers have comparatively high crystallinity and comparatively high conductivity. Therefore, it is not necessary to perform the heat treatment for graphitization which is applied to the carbon fibers obtained by the floating catalyst method. Since the carbon fibers synthesized by the supported catalyst method are not subjected to the heat treatment at high temperature for graphitization, the catalyst metals remain in a percentage order in the carbon fibers.

CITATION LIST

Patent Literature

Patent Literature 1: JP 2002-308610 A
Patent Literature 2: JP 4197729 B
Patent Literature 3: JP 2010-1173 A
Patent Literature 4: WO 2006/50903 A

SUMMARY OF INVENTION

Technical Problem

Carbon fibers are mainly used as fillers for imparting electric conductivity or thermal conductivity to resins and the like. In this application, there has never arisen such a problem that catalyst metals contained in a product exerts an adverse influence on physical properties such as strength of resin composites.

Carbon fibers, which are synthesized by floating catalyst method and are subjected to graphitization treatment, are used as a conductive auxiliary agent in an electrode of a capacitor or a battery.

On the other hand, carbon fibers, which are synthesized by supported catalyst method and are not subjected to high-temperature heat treatment, enable low production cost. However, when the carbon fibers are added in an electrochemical device as a conductive auxiliary agent, a phenomenon occurs in which residual catalyst metals are ionized to precipitate metal during repetition of charging and discharging. If metal precipitated on the electrode grows enough to penetrate a separator, short-circuit occurs between a cathode and an anode.

Patent Literature 1 discloses a method for purification of carbon nanotubes in which the carbon nanotubes are dipped in an acidic solution containing at least sulfuric acid to remove metal. Even if heat treatment after pickling disclosed in Patent Literature 1, i.e. heat treatment at temperature lower than 600° C. is carried out, sulfuric acid ions remain on surfaces of carbon nanotubes. The addition of the carbon nanotubes to a cathode of a battery may cause corrosion of a cathode active material due to an influence of sulfuric acid ions. Since the number of the steps increases by pickling, production cost also increases.

Patent Literature 2 discloses a catalyst for production of a carbon fiber, composed of Fe, Mo and V. This Literature discloses that this catalyst enables the production of a carbon fiber which contains impurities at low level and is also excellent in thermal conductivity or electric conductivity.

Patent Literature 3 discloses a carbon nanofiber containing Fe, Co, at least one element selected from the group consisting of Ti, V, Cr and Mn, and at least one element selected from the group consisting of W and Mo. This Literature discloses that a carbon nanofiber which contains fewer impurities and is excellent in fillability and dispersibility in the resin and the like, and also exerts high effect of imparting electric conductivity or thermal conductivity.

However, Patent Literatures 2 and 3 do not disclose that an electrochemical elution amount of metal is reduced.

Patent Literature 4 discloses supported catalyst which is obtained by coprecipitation of a catalyst metal component composed of a combination of Mn, Co and Mo or a combination of Mn and Co, and a carrier metal component such as Al, Mg or the like. However, even if carbon nanotubes obtained by using the catalyst disclosed specifically in Patent Literature 4 are used as a conductive auxiliary agent of an electrode, sufficient conductivity imparting effect is not exerted. Furthermore, this Literature does not disclose that the electrochemical elution amount of metal is reduced.

An object of the present invention is to provide carbon fibers with low metal ion elution amount, which may be sometimes precipitated on an electrode of a battery to cause short-circuit, without subjecting to high-temperature heat treatment.

Solution to Problem (1) Carbon fibers comprising Fe, at least one catalyst metal selected from the group consisting of Mo and V, and a carrier; wherein the carbon fibers have an R value (ID/IG) as measured by Raman spectroscopy of 0.5 to 2.0, and have an electrochemical elution amount of catalyst metal of not more than 0.01% by mass.
(2) The carbon fibers according to (1), in which the carrier comprises metal oxide.
(3) The carbon fibers according to (1) or (2), in which the carbon fibers have a lattice constant C0 as measured by X-ray diffraction of 0.680 nm to 0.695 nm.
(4) The carbon fibers according to any one of (1) to (3), in which {mass of Fe/(mass of Fe+mass of carrier)}×100 (% by mass) is not less than 5% by mass and not more than 30% by mass.
(5) The carbon fibers according to any one of (1) to (4), in which the mole of Mo to mole of Fe is not less than 0.1% by mol and less than 5% by mol.
(6) The carbon fibers according to any one of (1) to (5), in which the mole of V to the mole of Fe is not less than 0.1% by mol and not more than 20% by mol.
(7) The carbon fibers according to any one of (1) to (6), in which the mole of V to the mole of Fe is not less than 0.1% by mol and not more than 5% by mol.
(8) The carbon fibers according to any one of (1) to (5), wherein the catalyst metal is composed only of Fe and Mo.
(9) The carbon fibers according to any one of (1) to (8), in which the carbon fibers form aggregates, and the carbon fibers in the aggregates are not oriented in a fixed direction.
(10) The carbon fibers according to (9), in which the aggregates have a 50% particle diameter ($D_{50}$) of not less than 3 μm and not more than 20 μm in volume-based cumulative particle size distribution as measured by laser diffraction particle size analysis.
(11) A composite material comprising the carbon fibers according to any one of (1) to (10).
(12) The composite material according to (11), which is an electrode material.
(13) An electrochemical device comprising the carbon fibers according to any one of (1) to (10).
(14) A catalyst for producing carbon fibers, comprising Fe, at least one catalyst metal selected from the group consisting of Mo and V, and a carrier; wherein Mo accounts for not less than 0.1% by mol and less than 5% by mol based on Fe.
(15) The catalysts for producing carbon fibers according to (14), wherein V accounts for not less than 0.1% by mol and not more than 20% by mol based on Fe.
(16) A method for evaluation of a metal elution amount of carbon fibers added to an electrode in a battery or a capacitor, the method comprising the steps of
(a) applying a voltage to a cell for evaluation, the cell comprising a working electrode composed of carbon fiber/PTFE composite electrode, a separator, an electrolytic solution, and a counter electrode composed of a Li metal foil;
(b) allowing metal contained in the carbon fiber/PTFE composite electrode to be eluted as metal ions in the electrolytic solution through application of a voltage, followed by reduction on the counter electrode to precipitate metal;
(c) recovering the precipitated metal; and
(d) determining the amount of the recovered metal.

Advantageous Effects of Invention

The carbon fibers in the present invention can be used to be added to electrochemical devices such as batteries, capacitors and hybrid capacitors since the carbon fibers have a small electrochemical metal elution amount. Use of the method for evaluation of the metal elution amount in the present invention enables evaluation of the degree of an influence on electrochemical devices such as batteries and capacitors in advance.

DESCRIPTION OF EMBODIMENTS

Figure 1:
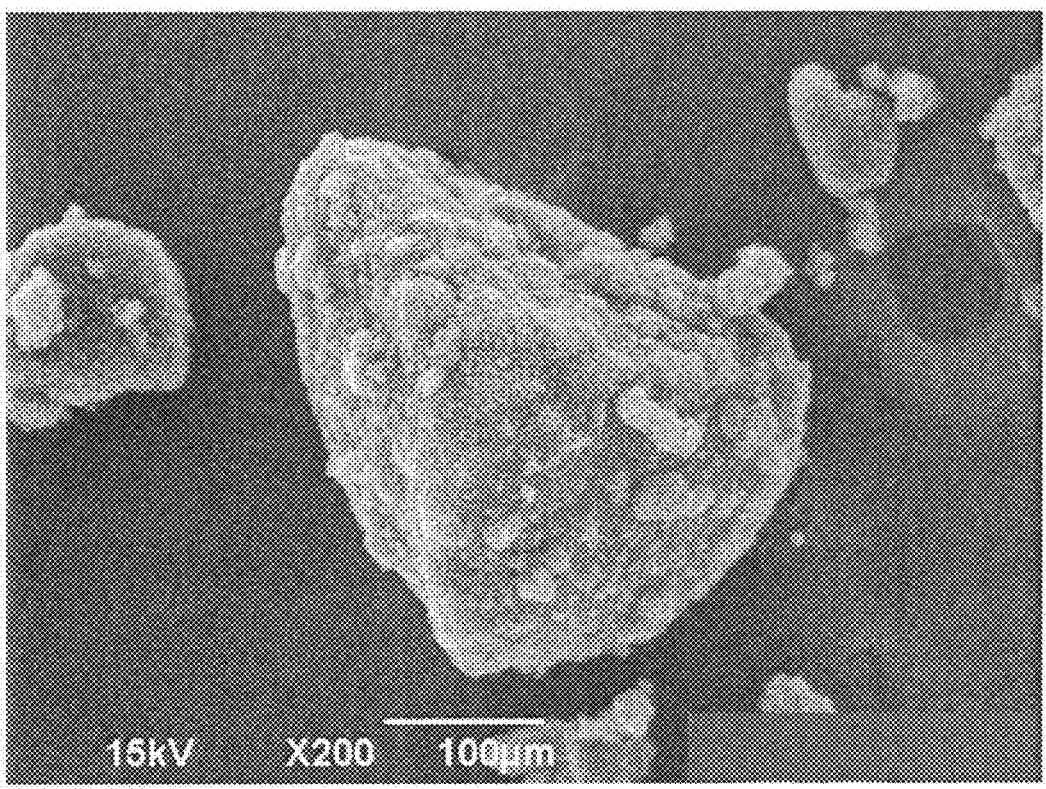
FIG. 1 shows an example of a scanning electron micrograph of carbon fiber aggregates immediately after synthesis (magnification: 200 times).

The present invention will be described in detail below.
In the present invention, the thus synthesized carbon fibers are used without being subjected to high-temperature heat treatment for graphitization.

As a result of the measurement of Raman spectra of the carbon fibers which are not subjected to heat treatment for graphitization, a peak intensity ratio R value (ID/IG) of a so-called D peak with an absorption at about 1,360 $cm^{-1}$ to a so-called G peak with an absorption at about 1,580 $cm^{-1}$ is from 0.5 to 2.0. An R value of the carbon fibers subjected to a heat treatment for graphitization is usually from about 0.1 to 0.4.

As a result of the measurement of X-ray diffraction of the carbon fibers which are not subjected to heat treatment for graphitization using the Gakushin method ("Carbon", No. 36, pp. 25-34, 1963), a lattice constant C0 by X-ray diffraction is from 0.680 to 0.695 nm. The C0 of the carbon fibers subjected to heat treatment for graphitization is usually less than 0.680 nm.

The method for production of carbon fibers in the present invention is not particularly limited, and the carbon fibers are preferably carbon fibers synthesized by vapor phase method, and more preferably carbon fibers synthesized by supported catalyst method. The supported catalyst method is a method in which carbon fibers are produced by reacting with carbon source in vapor phase, using catalysts which comprises catalyst metals supported on carrier. Examples of the carrier include alumina, magnesia, silica-titania, calcium carbonate and the like. The carrier is preferably in the form of a particulate. The supporting method is not particularly limited and, for example, supporting can be carried out by impregnating carrier with a solution of compounds containing a catalyst metal element. Supporting can also be carried out by coprecipitating a solution of compounds containing a catalyst metal element and compounds containing elements composing a carrier, or by other known supporting methods.

Examples of the carbon source include methane, ethylene, acetylene and the like. The reaction can be carried out in a reaction vessel such as a fluidized bed, a moving bed or a fixed bed. The temperature in a reaction vessel is preferably set in a range from 500° C. to 800° C. To supply the carbon source to the reaction vessel, carrier gas can be used. Examples of the carrier gas include hydrogen, nitrogen, argon and the like. The reaction time is preferably from 5 to 120 minutes.

The fiber diameter of the carbon fibers is not less than 5 nm and not more than 500 nm, and preferably not less than 7 nm and not more than 200 nm. The fiber diameter of less than 5 nm may cause difficulty in disentangling and dispersing each fiber.

An aspect ratio of the carbon fibers is preferably not less than 100 and not more than 1,000. Small aspect ratio may decrease the degree of entanglement between fibers and thus cause difficulty in forming an efficient conductive network. A large aspect ratio may increase the degree of entanglement between fibers and thus cause difficulty in dispersing the fibers.

A BET specific surface area of the carbon fibers is preferably not less than 10 $m^2/g$ and not more than 300 $m^2/g$, more preferably not less than 100 $m^2/g$ and not more than 280 $m^2/g$, and still more preferably not less than 200 $m^2/g$ and not more than 270 $m^2/g$.

The carbon fibers in a preferred embodiment in the present invention comprise Fe, at least one catalyst metal selected from the group consisting of Mo and V.

A combination of catalyst metals is preferably a combination of two metals, such as a combination of Fe and Mo and a combination of Fe and V, and more preferably a combination of three metals, such as a combination of Fe, Mo and V.

A mole ratio of Mo to Fe is preferably not less than 0.1% by mol and less than 5% by mol, more preferably not less than 0.3% by mol and not more than 3% by mol, and particularly preferably not less than 0.5% by mol and not more than 2% by mol.

A mole ratio of V to Fe is preferably not less than 0.1% by mol and not more than 20% by mol, more preferably not less than 0.3% by mol and not more than 5% by mol, and particularly preferably not less than 0.5% by mol and not more than 3% by mol.

The supporting amount of Fe in the catalysts is usually not less than 5% by mass and not more than 30% by mass, preferably not less than 10% by mass and not more than 25% by mass, and more preferably not less than 12% by mass and not more than 20% by mass, based on the total mass of the carrier and the Fe. In case the supporting amount is more than 30% by mass, production cost increases, and also the residual catalyst metals may be likely to be precipitated on an anode as a result of ionization when added to a cathode of a lithium ion battery as a conductive auxiliary agent. In case the supporting amount is less than 5% by mass, the amount of carbon fibers produced may decrease, leading to increased production cost.

There is no particular limitation on a precursor for catalyst metals, and it is employed to use compounds containing catalyst metals, for example, inorganic salts such as nitrate, sulfate and carbonate of the catalyst metals; organic salts such as acetate; organic complexes such as an acetylacetone complex; and organometallic compounds. From the viewpoint of reactivity, nitrate, an acetylacetone complex, and the like are preferred.

The carrier is not limited as long as it is stable in gas phase reaction temperature range, and inorganic oxide or inorganic carbonate is usually used. Examples thereof include alumina, zirconia, titania, magnesia, calcium carbonate, calcium hydroxide, calcium oxide, strontium oxide, barium oxide, zinc oxide, strontium carbonate, barium carbonate, silica, diatomaceous earth, zeolite and the like. From the viewpoint of decreasing the content of impurities, alumina, magnesia, titania, calcium carbonate, calcium hydroxide or calcium oxide are preferred and alumina is particularly preferred. The carrier is preferably in the form of a particulate.

The method for preparing catalysts is not particularly limited and the catalyst is produced, particularly preferably, by an impregnation method which comprises impregnating a carrier with a solution containing a catalyst metal element.

Specific examples thereof include a method in which a catalyst metal precursor compound is dissolved or dispersed in a solvent and particulate carrier is impregnated with the obtained solution or dispersion, followed by drying.

The solution containing a catalyst metal element may be either a liquid organic compound containing a catalyst metal element, or a solution prepared by dissolving or dispersing a compound containing a catalyst metal element in an organic solvent or water. Examples of the organic solvent as used herein include aromatic hydrocarbons such as benzene, toluene, xylene and the like; saturated hydrocarbons such as hexane, cyclohexane and the like; alcohols such as methanol, ethanol and the like; ethers such as diethyl ether, dimethyl ether, methyl ethyl ether, furan, dibenzofuran, tetrahydrofuran and the like; aldehydes such as formaldehyde, acetaldehyde, propionaldehyde, acrolein, benzaldehyde and the like; and halogenated hydrocarbons such as carbon tetrachloride, chloroform, trichloroethylene, chloroethane and the like.

To the solution containing a catalyst metal element, a dispersing agent or a surfactant (preferably cationic surfactant, anionic surfactant) may be added for the purpose of improving dispersibility of the catalyst metal element. The concentration of a catalyst metal element in the solution containing a catalyst metal element can be appropriately selected according to the type of the solvent and catalyst metals. The amount of the solution containing a catalyst metal element to be mixed with the carrier preferably corresponds to a liquid absorption amount of the carrier.

After sufficiently mixing the solution containing a catalyst metal element with the carrier, drying is usually carried out at 70 to 150° C. In the drying step, vacuum drying may be used.

There is no particular limitation on carbon source (carbon-containing compound) used in the production of the carbon fibers. It is possible to use the whole organic compounds as the carbon-containing compound, in addition to $CCl_4$, $CHCl_3$, $CH_2Cl_2$, $CH_3Cl$, $CO$, $CO_2$, $CS_2$ and the like. Examples of the compound having particularly high usability include $CO$, $CO_2$, aliphatic hydrocarbon and aromatic hydrocarbon. It is also possible to use carbon compounds containing elements such as nitrogen, phosphorus, oxygen, sulfur, fluorine, chlorine, bromine, iodine and the like.

Specific examples of preferred carbon-containing compound include inorganic gases such as $CO$, $CO_2$ and the like; alkanes such as methane, ethane, propane, butane, pentane, hexane, heptane, octane and the like; alkenes such as ethylene, propylene, butadiene and the like; alkynes such as acetylene and the like; monocyclic aromatic hydrocarbons such as benzene, toluene, xylene, styrene and the like; polycyclic compounds having a condensed ring, such as indene, naphthalene, anthracene, phenanthrene and the like; cycloparaffins such as cyclopropane, cyclopentane, cyclohexane and the like; cycloolefins such as cyclopentene, cyclohexene, cyclopentadiene, dicyclopentadiene and the like; and alicyclic hydrocarbon compounds having a condensed ring, such as steroid and the like. It is also possible to use derivatives in which these hydrocarbons containing oxygen, nitrogen, sulfur, phosphorus, halogen and the like, for example, oxygen-containing compounds such as methanol, ethanol, propanol, butanols and the like; sulfur-containing aliphatic compounds such as methylthiol, methyl ethyl sulfide, dimethyl thioketone and the like; sulfur-containing aromatic compounds such as phenylthiol, diphenyl sulfide and the like; sulfur- or nitrogen-containing heterocyclic compounds such as pyridine, quinoline, benzothiophene, thiophene and the like; halogenated hydrocarbons such as chloroform, carbon tetrachloride, chloroethane, trichloroethylene and the like; and natural gas, gasoline, lump oil, heavy oil, creosote oil, kerosene, turpentine oil, camphor oil, pine oil, gear oil, cylinder oil, and the like. It is also possible to use these compounds as a mixture of two or more compounds.

Of these compounds, preferred carbon-containing compounds are CO, methane, ethane, propane, butane, ethylene, propylene, butadiene, methanol, ethanol, propanol, butanol, acetylene, benzene, toluene, xylene, and a mixture thereof, and particularly preferred carbon-containing compound are ethylene, propylene and ethanol.

In the method for production of carbon fibers, it is recommended to use carrier gas, in addition to these carbon-containing compounds. It is possible to use, as the carrier gas, hydrogen gas, nitrogen gas, carbon dioxide gas, helium gas, argon gas, krypton gas, or mixed gas thereof. However, gas containing oxygen molecule (i.e. oxygen in a molecule state: $O_2$) such as air is not suited for use since it causes deterioration of the catalyst. The catalyst metal precursor compound is sometimes in an oxidation state. In such case, a gas containing a reductive hydrogen gas is preferably used as the carrier gas. Therefore, the carrier gas is preferably a gas containing a hydrogen gas in the amount of 1% by volume or more, more preferably 30% by volume or more, and most preferably 85% by volume or more, for example, a 100% by volume hydrogen gas, or a gas prepared by diluting a hydrogen gas with a nitrogen gas.

A carbon-containing compound, which is liquid or solid at normal temperature, is preferably introduced as carbon-containing gas after being vaporized by heating. The amount of these carbon-containing gases cannot be unambiguously determined since it varies depending on the catalyst, carbon-containing compound and reaction conditions to be used. Commonly, (carbon-containing gas flow rate)/(carrier gas flow rate+carbon-containing gas flow rate) is preferably 10 to 90% by volume, and more preferably 30 to 70% by volume. In case the carbon-containing compound is ethylene, the amount is particularly preferably within a range of 30 to 90% by volume.

The temperature, at which the catalyst is brought into contact with the carbon-containing compound, varies depending on the carbon-containing compound to be used, and is commonly from 400 to 1,100° C., and preferably from 500 to 800° C.

With regard to the carbon fibers in a preferred embodiment of the present invention, electrochemical elution amount of metal is not more than 0.01% by mass, more preferably not more than 0.005% by mass, and particularly preferably not more than 0.002% by mass.

The carbon fibers in the present invention can be subjected to grinding treatment for the purpose of decreasing the size of the aggregates. Examples of the grinding method include dry grinding method and wet grinding method. Examples of the apparatus for dry grinding include a ball mill which utilizes an impact force and a shear force of media, a pulverizer which utilizes an impact force such as a hammer mill, a jet mill which utilizes collision between substances to be ground, and the like. Examples of the apparatus for wet grinding include a beads mill which utilizes a shear force of media. The carbon fibers in a preferred embodiment of the present invention form aggregates, and the carbon fibers in the aggregates are not oriented in a fixed direction.

The 50% particle diameter ($D_{50}$) in volume-based cumulative particle size distribution as measured by laser diffraction particle size analysis of the aggregates is preferably not less than 3 µm and not more than 20 µm, and more preferably not less than 5 µm and not more than 10 µm. A conventionally used measuring apparatus can be employed and, for example, Microtrac HRA manufactured by Nikkiso Co., Ltd. can be used.

EXAMPLES

The present invention will be more specifically described below by way of typical examples. These are exemplary of the present invention and are not to be considered as limiting.

<Production of Carbon Fiber/PTFE Composite Electrode>

After weighing 1.6 g (W1) of carbon fibers and 0.4 g of polytetrafluoroethylene (PTFE), they were placed in an agate mortar and then powders were uniformly mixed using a pestle. The mixed powder was mixed more strongly so as to extend PTFE to obtain a rubbery carbon fiber/PTFE composite.

The obtained composite was cut into pieces each having a predetermined size (measuring 20 mm×20 mm×0.5 mmt) and then contact-bonded with an aluminum mesh (size measuring 20 mm×20 mm×0.03 mmt) welded with an aluminum tab lead using a uniaxial hydraulic press under a pressure of 15 MPa to obtain a carbon fiber/PTFE composite electrode.

<Production of Cell for Evaluation>

Production of a cell, disassembling of the cell, and dissolution of a counter electrode in ethanol were carried out in a dry argon atmosphere at a dew point of −80° C. or lower. Using the carbon fiber/PTFE composite electrode as a working electrode, a lithium metal foil (measuring 25 mm×25 mm×0.05 mmt) (counter electrode) obtained by contact bonding of a copper mesh, including two separators interposed therebetween. A laminate was inserted into a bag made of an aluminum laminate material and then a tab lead portion was heat-sealed to produce a bipolar cell. An electrolytic solution was injected into the bipolar cell, followed by vacuum heat sealing to obtain a test cell.

<Method for Metal Elution Test>

The cell for evaluation was connected to a potentio/galvanostat (manufactured by Biologic Science Instruments), and then a voltage of 4.3 V was applied to the working electrode based on a reference electrode. Then, the cell was maintained (for 24 hours) until a current value is sufficiently attenuated. Metal contained in the carbon fiber/PTFE composite electrode is eluted in the electrolytic solution as ions by application of a voltage, and then reduced on a lithium metal foil as the counter electrode to precipitate as metal.

<Method for Evaluation of Electrochemical Elution Amount of Metal>

After completion of the test, the test cell was disassembled, and the counter electrode and the separator contacted with the counter electrode were taken out, and then the weight of the counter electrode was measured (W3). The counter electrode was dissolved in ethanol in an inert gas atmosphere. Ethanol was removed by heating from the ethanol solution of the counter electrode, and the entire residue was dissolved by concentrated nitric acid. The precipitated metal adhered to the separator was washed away by nitric acid. The thus obtained solution was analyzed by an ICP emission spectrometer (Vista-PRO manufactured by SII NanoTechnology Inc.) and each of Fe, Mo and V contained in the solution was quantitatively determined (W2, W2', W2"). As a reference, unused lithium metal was dissolved in ethanol and then ethanol was removed by heating. The residue was dissolved by nitric acid and the solution was analyzed by an ICP emission spectrometer, and then each of Fe, Mo and V contained in the solution was quantitatively determined (Wr, Wr', Wr"). Each amount [% by mass] of the eluted and precipitated Fe, Mo and V was calculated from the equations (1), (2) and (3).

$$\text{Fe elution amount [\% by mass]} = \{(W2/W1) - (Wr/W3)\} \times 100 \quad \text{Equation (1)}$$

$$\text{Mo elution amount [\% by mass]} = \{(W2'/W1) - (Wr'/W3)\} \times 100 \quad \text{Equation (2)}$$

$$\text{V elution amount [\% by mass]} = \{(W2''/W1) - (Wr''/W3)\} \times 100 \quad \text{Equation (3)}$$

The electrochemical elution amount of metal is the sum total of the elution amounts of the respective metals.

<Weight Gain>

An increase in weight is expressed by a ratio (mass of the carbon fibers/mass of catalyst) of mass of the obtained carbon fiber to mass of catalyst used.

<Measurement of Particle Size Distribution of Carbon Fiber Aggregates>

The weighed sample (0.007 g) was put in a beaker containing 20 ml of pure water, and 0.2 g of a Triton dilution (diluted 100 times with pure water) was added dropwise. After treating the beaker by an ultrasonic disperser for 5 minutes, 30 ml of pure water was added in the beaker and the beaker was treated again by the ultrasonic disperser for 3 minutes. Particle size distribution was measured by Microtrac HRA manufactured by Nikkiso Co., Ltd.

Example 1

Fe—Mo(1)-V(3)/Alumina

In 1.41 parts by mass of water, 1.81 parts by mass of iron(III) nitrate nonahydrate was added and dissolved, and then 0.008 part by mass of hexaammonium heptamolybdate and 0.016 part by mass of ammonium metavanadate were added and dissolved to obtain a solution A.

The solution A was added dropwise in 1 part by mass of alumina (manufactured by Nippon Aerosil Co., Ltd.), followed by mixing. After mixing, the mixture was vacuum-dried at 100° C. for 4 hours. After drying, the mixture was ground by a mortar to obtain catalyst. The catalyst contained Mo in the amount of 1% by mol and V in the amount of 3% by mol based on Fe, and {mass of Fe/(mass of Fe+mass of carrier)}×100 (% by mass) was 20% by mass.

The weighed catalyst was placed on a quartz boat and the quartz boat was put in a reaction tube made of quartz, followed by sealing. After replacing the atmosphere in the reaction tube with nitrogen gas, the temperature of a reactor was raised from room temperature to 680° C. over 60 minutes while allowing a nitrogen gas to flow. While allowing nitrogen to flow, the temperature was maintained at 680° C. for 30 minutes.

While maintaining at the temperature of 680° C., the nitrogen gas was changed to a mixed gas A of hydrogen gas (250 parts by volume) and ethylene (250 parts by volume) and the mixed gas A was allowed to flow through the reactor, followed by vapor phase growing for 15 minutes. The mixed gas A was changed to nitrogen gas, the atmosphere in the reactor was replaced with the nitrogen gas, followed by cooling to room temperature. The reactor was opened and the quartz boat was taken out. As a result, carbon fibers grown in the presence of the catalyst as a nucleus were obtained. The obtained carbon fibers formed aggregates as shown in FIG. 1. The aggregates had a 50% particle diameter ($D_{50}$) of 50 to 600 μm in volume-based cumulative particle size distribution. The evaluation results of the carbon fibers are shown in Table 1. As a result of the measurement of Raman spectra of the carbon fibers, a peak intensity ratio R value (ID/IG) of a so-called D peak with an absorption at about 1,360 $cm^{-1}$ to a so-called G peak with an absorption at about 1,580 $cm^{-1}$ was 1.20. Lattice constant C0 by X-ray diffraction was 0.690 nm.

Example 2

Fe—Mo(1)-V(20)/Alumina

In 0.95 part by mass of methanol (manufactured by Kanto Chemical Co., Inc.), 0.105 part by mass of ammonium metavanadate (manufactured by Kanto Chemical Co., Inc.) was added and dissolved, and then 1.81 parts by mass of iron(III) nitrate nonahydrate (manufactured by Kanto Chemical Co., Inc.) and 0.008 part by mass of hexaammonium heptamolybdate (manufactured by JUNSEI CHEMICAL CO., LTD.) were added and dissolved to obtain a solution A.

The solution A was added dropwise in 1 part by mass of alumina (manufactured by Nippon Aerosil Co., Ltd.), followed by mixing. After mixing, the mixture was vacuum-dried at 100° C. for 4 hours. After drying, the mixture was ground by a mortar to obtain catalyst. The catalyst contained Mo in the amount of 1% by mol and V in the amount of 20% by mol based on Fe, and {mass of Fe/(mass of Fe+mass of carrier)}×100 (% by mass) was 20% by mass.

The weighed catalyst was placed on a quartz boat and the quartz boat was put in a reaction tube made of quartz, followed by sealing. After replacing the atmosphere in the reaction tube with a nitrogen gas, the temperature of a reactor was raised from room temperature to 680° C. over 60 minutes while allowing nitrogen gas to flow. While allowing nitrogen to flow, the temperature was maintained at 680° C. for 30 minutes.

While maintaining at the temperature of 680° C., the nitrogen gas was changed to mixed gas A of hydrogen gas (250 parts by volume) and ethylene (250 parts by volume) and the mixed gas A was allowed to flow through the reactor, followed by vapor phase growing for 15 minutes. The mixed gas A was changed to nitrogen gas, the atmosphere in the reactor was replaced with the nitrogen gas, followed by cooling to room temperature. The reactor was opened and the quartz boat was taken out. As a result, carbon fibers grown in the presence of the catalyst as a nucleus were obtained. The obtained carbon fibers formed aggregates like in Example 1. The evaluation results of the carbon fibers are shown in Table 1. The carbon fibers had the R value (ID/IG) as measured by Raman spectroscopy of 1.23, and the lattice constant C0 as measured by X-ray diffraction of 0.690 nm.

Example 3

Fe—Mo(1)/Alumina

In the same manner as in Example 1, except that ammonium metavanadate was not used, catalyst was obtained. The catalyst contained Mo in the amount of 1% by mol based on Fe, and {mass of Fe/(mass of Fe+mass of carrier)}×100 (% by mass) was 20% by mass.

In the same manner as in Example 1, carbon fibers were obtained by using the catalyst. The obtained carbon fibers formed aggregates like in Example 1. The evaluation results of the carbon fibers are shown in Table 1. The carbon fibers had the R value (ID/IG) as measured by Raman spectroscopy of 1.20, and the lattice constant C0 as measured by X-ray diffraction of 0.690 nm.

Example 4

Fe—V(20)/Alumina

In the same manner as in Example 1, except that hexaammonium heptamolybdate was not used, catalyst was obtained. The catalyst contained V in the amount of 20% by mol based on Fe, and {mass of Fe/(mass of Fe+mass of carrier)}×100 (% by mass) was 20% by mass. In the same manner as in Example 2, carbon fibers were obtained by using the catalyst. The obtained carbon fibers formed aggregates like in Example 1. The evaluation results of the carbon fibers are shown in Table 1. The carbon fibers had the R value (ID/IG) as measured by Raman spectroscopy of 1.30, and the lattice constant C0 as measured by X-ray diffraction of 0.690 nm.

Example 5

Fe—Mo(1)/Alumina

In the same manner as in Example 1, except that 0.99 part by mass of iron(III) nitrate nonahydrate was added and dissolved in 1.91 parts by mass of water, and then 0.004 part by mass of hexaammonium heptamolybdate was added and dissolved, catalyst was obtained. The catalyst contained Mo in the amount of 1% by mol based on Fe, and {mass of Fe/(mass of Fe+mass of carrier)}×100 (% by mass) was 12% by mass. In the same manner as in Example 1, carbon fibers were obtained by using the catalyst. The obtained carbon fibers formed aggregates like in Example 1. The evaluation results of the carbon fibers are shown in Table 1. The carbon fibers had the R value (ID/IG) as measured by Raman spectroscopy of 1.20, and the lattice constant C0 as measured by X-ray diffraction of 0.690 nm.

Example 6

Fe—Mo(3)-V(3)/Alumina

In the same manner as in Example 1, except that 1.28 parts by mass of iron(III) nitrate nonahydrate was added and dissolved in 1.73 parts by mass of water, and then 0.017 part by mass of hexaammonium heptamolybdate and 0.011 part by mass of ammonium metavanadate were added and dissolved, catalyst was obtained. The catalyst contained Mo in the amount of 3% by mol and V in the amount of 3% by mol based on Fe, and {mass of Fe/(mass of Fe+mass of carrier)}×100 (% by mass) was 15% by mass. In the same manner as in Example 1, carbon fibers were obtained by using the catalyst. The obtained carbon fibers formed aggregates like in Example 1. The evaluation results of the carbon fibers are shown in Table 1. The carbon fibers had the R value (ID/IG) as measured by Raman spectroscopy of 1.20, and the lattice constant C0 as measured by X-ray diffraction of 0.690 nm.

Example 7

Fe—Mo(1)/Alumina

In the same manner as in Example 1, except that 2.41 parts by mass of iron(III) nitrate nonahydrate was added and dissolved in 1.06 parts by mass of water, and then 0.011 part by mass of hexaammonium heptamolybdate was added and dissolved, catalyst was obtained. The catalyst contained Mo in the amount of 1% by mol based on Fe, and {mass of Fe/(mass of Fe+mass of carrier)}×100 (% by mass) was 25% by mass. In the same manner as in Example 1, carbon fibers were obtained by using the catalyst. The obtained carbon fibers formed aggregates like in Example 1. The evaluation results of the carbon fibers are shown in Table 1. The carbon fibers had the R value (ID/IG) as measured by Raman spectroscopy of 1.20, and the lattice constant C0 as measured by X-ray diffraction of 0.690 nm.

Comparative Example 1

Fe—Mo(10)-V(10)/Alumina

In the same manner as in Example 1, except that the amount of hexaammonium heptamolybdate was changed to 0.079 part by mass, and the amount of ammonium metavanadate was changed to 0.052 part by mass, catalyst was obtained. The catalyst contained Mo in the amount of 10% by mol and V in the amount of 10% by mol based on Fe, and {mass of Fe/(mass of Fe+mass of carrier)}×100 (% by mass) was 20% by mass. In the same manner as in Example 1, carbon fibers were obtained by using the catalyst. The evaluation results of the carbon fibers are shown in Table 1. The carbon fibers had the R value (ID/IG) as measured by Raman spectroscopy of 1.55, and the lattice constant C0 as measured by X-ray diffraction of 0.691 nm.

Comparative Example 2

Fe—Mo(1)-V(40)/Alumina

In the same manner as in Example 2, except that the amount of ammonium metavanadate was changed to 0.210 part by mass, catalyst was obtained. The catalyst contained Mo in the amount of 1% by mol and V in the amount of 40% by mol based on Fe, and {mass of Fe/(mass of Fe+mass of carrier)}×100 (% by mass) was 20% by mass. In the same manner as in Example 2, carbon fibers were obtained by using the catalyst. The evaluation results of the carbon fibers are shown in Table 1. The carbon fibers had the R value (ID/IG) as measured by Raman spectroscopy of 1.50, and the lattice constant C0 as measured by X-ray diffraction of 0.691 nm.

Comparative Example 3

Fe—Mo(10)/Alumina

In the same manner as in Example 1, except that 1.28 parts by mass of iron(III) nitrate nonahydrate was added and dissolved in 1.72 parts by mass of water, and then 0.056 part by mass of hexaammonium heptamolybdate was added and dissolved, catalyst was obtained. The catalyst contained Mo in the amount of 10% by mol based on Fe, and {mass of Fe/(mass of Fe+mass of carrier)}×100 (% by mass) was 15% by mass. In the same manner as in Example 1, carbon fibers were obtained by using the catalyst. The evaluation results of the carbon fibers are shown in Table 1. The carbon fibers had the R value (ID/IG) as measured by Raman spectroscopy of 1.55, and the lattice constant C0 as measured by X-ray diffraction of 0.691 nm.

TABLE 1

| | Example | | | | | | | Comp. Ex. | | |
|---|---|---|---|---|---|---|---|---|---|---|
| | 1 | 2 | 3 | 4 | 5 | 6 | 7 | 1 | 2 | 3 |
| Fe Supporting (wt %) | 20 | 20 | 20 | 20 | 12 | 15 | 25 | 20 | 20 | 15 |
| Catalyst metal Mo (mol %) | 1 | 1 | 1 | — | 1 | 3 | 1 | 10 | 1 | 10 |
| Catalyst metal V (mol %) | 3 | 20 | — | 20 | — | 3 | — | 10 | 40 | — |
| Carrier | Alumina | Alumina | Alumina | Alumina | Alumina | Alumina | Alumina | Alumina | Alumina | Alumina |
| Weight gain (times) | 15.3 | 21.5 | 11.9 | 19.8 | 9.0 | 16.7 | 14.5 | 22.7 | 20.0 | 11.9 |
| Electrochemical elution amount (mass %) | 0.0028 | 0.0050 | 0.0021 | 0.0059 | 0.0013 | 0.0062 | 0.0041 | 0.0260 | 0.0116 | 0.0137 |

As shown in Table 1, with regard to the carbon fibers obtained by using the catalysts in which not less than 0.1% by mol and less than 5% by mol of Mo and/or not less than 0.1% by mol and not more than 20% by mol of V are added to Fe (Examples 1 to 7), an electrochemical elution amount of metal decreases as compared with the carbon fibers obtained by using the catalysts in which the amounts of Mo and/or V added to Fe do not fall within the above range (Comparative Examples 1 to 3).

Example 8

Figure 2:
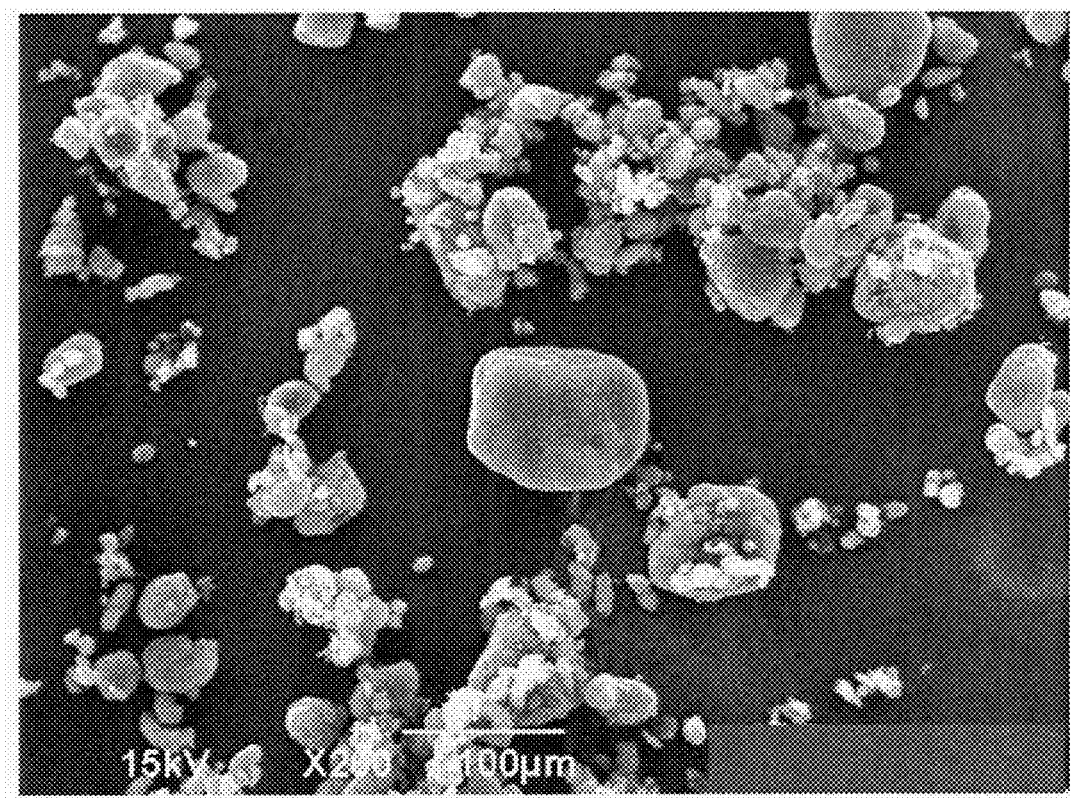
FIG. 2 shows an example of a scanning electron micrograph of a product obtained by griding carbon fiber aggregates immediately after synthesis (magnification: 200 times).
Figure 3:
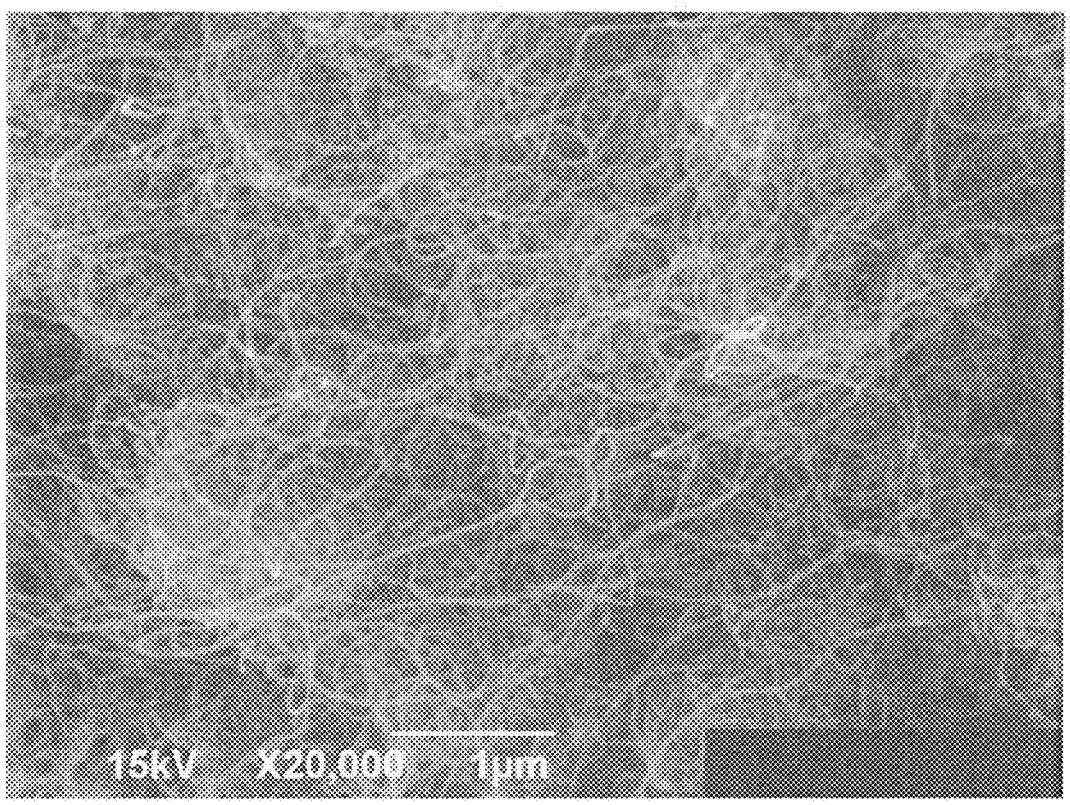
FIG. 3 shows an example of a scanning electron micrograph of a product obtained by grinding carbon fiber aggregates immediately after synthesis (magnification: 20,000 times).

Using a jet mill STJ-200 manufactured by Seishin Enterprise Co., Ltd., the aggregates of the carbon fibers obtained in Example 1 were ground under the conditions of a pusher nozzle pressure of 0.64 MPa and a gliding nozzle pressure of 0.60 MPa. The ground carbon fibers formed aggregates as shown in FIG. 2. A 50% particle diameter $D_{50}$ in volume-based cumulative particle size distribution of the aggregates was 6 μm.

Using the carbon fibers after grinding treatment, a metal elution test was carried out. As a result, the elution amount of metal is 0.0036% by mass, and a large change in the elution amount of metal is not recognized.

The invention claimed is:

1. A catalyst for production of carbon fibers, the catalyst comprising catalyst metals and a carrier; wherein
   the catalyst metals consist of Fe and Mo or consist of Fe, Mo and V, and
   Mo accounts for not less than 0.1% by mol and less than 5% by mol based on Fe.

2. Carbon fibers comprising the catalyst according to claim 1, wherein the carbon fibers have an R value (ID/IG) as measured by Raman spectroscopy of 0.5 to 2.0, and have an electrochemical metal elution amount of catalyst metal of not more than 0.01% by mass.

3. The carbon fibers according to claim 2, wherein the carrier comprises metal oxide.

4. The carbon fibers according to claim 2, wherein the carbon fibers have a lattice constant C0 as measured by X-ray diffraction of 0.680 nm to 0.695 nm.

5. The carbon fibers according to claim 2, wherein {mass of Fe/(mass of Fe+mass of carrier)}×100 (% by mass) is not less than 5% by mass and not more than 30% by mass.

6. The carbon fibers according to claim 2, wherein the carbon fibers forms aggregates, and the carbon fibers in the aggregates are not oriented in a fixed direction.

7. The carbon fibers according to claim 6, wherein the aggregates have a 50% particle diameter ($D_{50}$) of not less than 3 μm and not more than 20 μm in volume-based cumulative particle size distribution as measured by laser diffraction particle size analysis.

8. A composite material comprising the carbon fibers according to claim 2.

9. The composite material according to claim 8, which is an electrode material.

10. An electrochemical device comprising the carbon fibers according to claim 2.

11. The catalyst according to claim 1, in which the catalyst metals are supported on the carrier.

12. A catalyst for production of carbon fibers, the catalyst comprising catalyst metals and a carrier; wherein
   the catalyst metals consist of Fe and V or consist of Fe, Mo and V, and
   V accounts for not less than 0.1% by mol and not more than 20% by mol based on Fe.

13. Carbon fibers comprising the catalyst according to claim 12, wherein the carbon fibers have an R value (ID/IG) as measured by Raman spectroscopy of 0.5 to 2.0, and have an electrochemical metal elution amount of not more than 0.01% by mass.

14. The carbon fibers according to claim 13, wherein the mole of V to the mole of Fe is not less than 0.1% by mol and not more than 5% by mol.

15. A catalyst for production of carbon fibers, the catalyst comprising catalyst metals and a carrier; wherein
   the catalyst metals consist of Fe, Mo and V,
   Mo accounts for not less than 0.1% by mol and less than 5% by mol based on Fe, and
   V accounts for not less than 0.1% by mol and not more than 20% by mol based on Fe.

16. Carbon fibers comprising the catalyst according to claim 15, wherein the carbon fibers have an R value (ID/IG) as measured by Raman spectroscopy of 0.5 to 2.0, and have an electrochemical metal elution amount of not more than 0.01% by mass.

17. The carbon fibers according to claim 16, wherein the mole of V to the mole of Fe is not less than 0.1% by mol and not more than 5% by mol.

18. A method for producing carbon fibers, wherein the method comprises the steps of
   preparing a catalyst which comprises catalyst metals and a carrier; wherein the catalyst metals consist of Fe and Mo or consist of Fe, Mo and V, and Mo accounts for not less than 0.1% by mol and less than 5% by mol based on Fe, and reacting only a carbon source in a vapor phase using the catalyst to obtain carbon fibers having an electrochemical metal elution amount of not more than 0.01% by mass.

19. The method according to claim 18, wherein V accounts for not less than 0.1% by mol and not more than 20% by mol based on Fe.

20. A method for producing carbon fibers, wherein the method comprises the steps of preparing a catalyst which comprises catalyst metals and a carrier; wherein the catalyst metals consist of Fe and V or consist of Fe, Mo and V, and V accounts for not less than 0.1% by mol and not more than 20% by mol based on Fe, and reacting only a carbon source in vapor phase using the catalyst to obtain carbon fibers having an electrochemical metal elution amount of not more than 0.01% by mass.

\* \* \* \* \*